United States Patent
Cowan et al.

(10) Patent No.: US 7,154,498 B2
(45) Date of Patent: Dec. 26, 2006

(54) SYSTEM AND METHOD FOR SPATIO-TEMPORAL GUIDEPOINT MODELING

(75) Inventors: Brett Cowan, Auckland (NZ); Thomas O'Donnell, New York, NY (US); Alistair Young, Auckland (NZ)

(73) Assignee: Siemens Medical Solutions USA, Inc., Malvern, PA (US)

( * ) Notice: Subject to any disclaimer, the term of this patent is extended or adjusted under 35 U.S.C. 154(b) by 187 days.

(21) Appl. No.: 10/937,613

(22) Filed: Sep. 9, 2004

(65) Prior Publication Data

US 2005/0057562 A1     Mar. 17, 2005

Related U.S. Application Data

(60) Provisional application No. 60/501,629, filed on Sep. 10, 2003.

(51) Int. Cl.
*G06T 15/00* (2006.01)
(52) U.S. Cl. ......................... 345/419; 345/427; 382/131
(58) Field of Classification Search ...................... None
See application file for complete search history.

(56) References Cited

U.S. PATENT DOCUMENTS 5,457,754 A * 10/1995 Han et al. .................... 382/128
6,301,496 B1 * 10/2001 Reisfeld ...................... 600/407
6,961,454 B1 * 11/2005 Jolly .......................... 382/131

FOREIGN PATENT DOCUMENTS

WO     WO 01/01859 A1     1/2001

OTHER PUBLICATIONS

Young A. et al, "Frame-based 4D interactive modeling of heart motion" Nonrigid and Articulated Motion Workshop, 1997, IEEE Comput. Soc, US, 1997 pp. 128-135 XP010139162 Abstract.
Gerard O., et al. "Efficient Model-Based Quantification of Left Ventricular Function In 3-D Echocardiography" IEEE Transactions on Medical Imaging, IEEE Inc. New York, US, vol. 21, No. 9, Sep. 2002 pp. 1059-1068 XP00164023 abstract.
International Search Report.

* cited by examiner

*Primary Examiner*—Mark Zimmerman
*Assistant Examiner*—Enrique L. Santiago
(74) *Attorney, Agent, or Firm*—Donald B. Paschburg; F. Chau & Associates, LLC

(57) ABSTRACT

A method and system for spatio-temporal (4D) modeling of an object includes sampling the 4-D model at one point in time to create a 3-D model. This 3-D model is then fit based on user-supplied guide points, image forces (e.g., image edges) and prior shape models. Once the 3-D model fit is completed the full 4-D shape model is updated. Cardiac images can be spatio-temporally modeled to determine LV conditions.

14 Claims, 9 Drawing Sheets

SYSTEM AND METHOD FOR SPATIO-TEMPORAL GUIDEPOINT MODELING

CROSS-REFERENCE TO RELATED APPLICATION

This application claims the benefit of U.S. Provisional Application No. 60/501,629 filed on Sep. 10, 2003, titled as "Spatio-Temporal Guide Point Modeling for Fast Analysis of Four-Dimensional Cardiac Function", contents of which are incorporated herein by reference.

TECHNICAL FIELD

This invention relates to electronic imaging and more particularly to medical imaging using spatial and temporal parameters.

DISCUSSION OF THE RELATED ART

The field of medical imaging has seen many advances in recent times. Devices such as CT (Computerized Tomography) scans, MRI (Medical Resonance Imaging) are but a few examples of such advances. While creating newer devices has been an important goal, the need for effectively analyzing data captured by such devices can be thought of as an equally important goal.

A typical application of medical imaging is in the field of cardiovascular imaging, where without proper medical imaging techniques, the diagnosis and surgery of cardio vascular problems would become extremely risky. Medical imaging for heart particularly focuses on the Left Ventricle (LV). Functioning of the LV is of primary importance to cardiologists since it is the chamber responsible for pumping the blood to the body's extremities.

Medical imaging can generate a large number of images, and hence making the analysis of such images a challenging task. For example, a typical MRI scan to determine the LV conditions can result in a large number of datasets containing hundreds of images. Temporal characteristics of LV functions are widely used in clinical practice for diagnosis, prognosis and evaluation of systolic and diastolic dysfunction.

To segment the LV is to find its borders. Once the borders are found doctors can, for example, measure how much blood the LV is able to pump and determine the health of the LV. Automatic computer vision methods exist for detecting the borders but are prone to errors. Correction of such automatic segmentation errors is a time consuming task and becomes impractical as the number of images (and hence errors) increases. Hence, there is a need for a temporally coherent analysis method in which user interaction is real-time, efficient, intuitive and minimal.

Conventionally, 3D modeling of the heart images involves acquiring cardiac images over the cardiac cycle and then fitting a 3-D model onto borders of the heart in the images. This process involves drawing contours delineating the borders and fitting each individual phase over the cardiac cycle. This is an extremely labor intensive task. Semi-automatic techniques for drawing the contours speeds up the task somewhat, but since the resulting segmentations require validation and correction this too is time consuming. Hence, there is a need for a modeling technique that requires minimal human modeling inputs and is relatively error-free.

SUMMARY

A spatio-temporal method and system for modeling is disclosed. The domain is 4-D image data, that is, 3-D image volumes at discrete time points (phases). Therefore our model is 4-D (3-D+time) and may be sampled as a 3-D spatial model at a particular time instance. The user interacts with the sampled 3-D models since it is difficult for people to work directly in higher dimensions. The 3-D model fit is influenced by user-placed guide points on the images of a particular phase as well as image edge information. The characteristics of that 3-D model are propagated to influence the 4-D model as a whole in surrounding phases.

Since the motion of the heart is periodic, spherical harmonics are used to describe the 4-D model. More specifically, the parameters describing the shape are represented using harmonics so that the 3-D instance of the model at the start of the cardiac cycle is identical to that at the end.

By representing the parameters as continuous functions of time the model is 4-D. And, fitting to the guide points and image forces at one time point (phase) influences the overall 4-D shape. For reasons of efficiency, the user finishes fitting the 3-D model to a phase before the influence is propagated to other phases.

In phases where there are no guide points, a prior shape based on the 4-D model exists. Should the user choose to place guide points at that phase, this prior shape can also serve to influence the fit.

Hence, the need for fitting individual models to each phase eliminated. Rather placing guide points in a few phases will create a fit to the entire cardiac cycle. Typical application is cardiac imaging where a 4-D model of heart is fit over the phases covering the cardiac cycle.

BRIEF DESCRIPTION OF DRAWINGS

Preferred embodiments of the invention are described with reference to the accompanying drawings, of which.

DETAILED DESCRIPTION OF THE PREFERRED EMBODIMENTS

The preferred embodiments of the present invention will be described with reference to the appended drawings.

The description below uses an example of a body to illustrate at least one embodiment of the invention. The example used is that of a human heart. Those skilled in the art will appreciate that heart is only used as an illustration and any other body part, tissue and organ can be modeled in place of the illustration of the heart.

Figure 1:
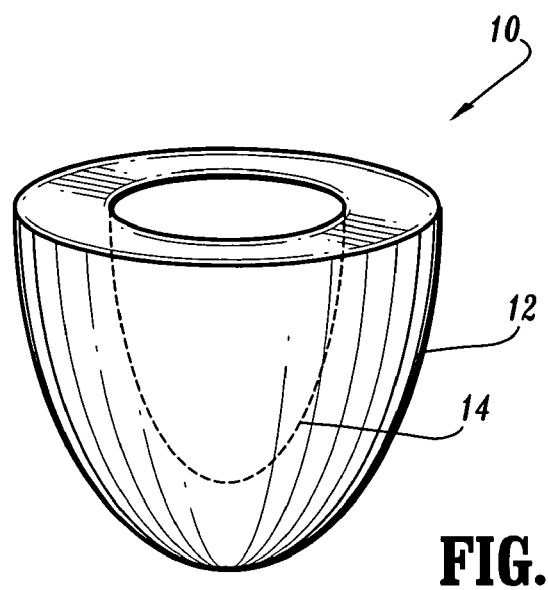
FIG. 1 is a representation of Left Ventricle of a heart.

FIG. 1 is a representation of an exemplary Left Ventricle (LV) of a heart. A schematic representation of a left ventricle 10 of an exemplary heart organ is shown. The outer wall 12 (epicardium) of the left ventricle 10 is shown as enclosing an inner wall 14 (endocardium). In at least one embodiment of the present invention, a scanned electronic image of the left ventricle 10 will be modeled in an electronic form. The model is described next.

The 3-D instance of the model may be described by two surfaces of bi-cubic spline patches representing the inner and outer walls. These are connected linearly to form 3-D finite elements. The control points of these splines are the model parameters. To make the model 4-D the control points become functions of time.

Fourier basis functions with five harmonics are used to provide an effective resolution for the model over cardiac cycles. As the cardiac cycle is repetitive in nature, the last phase of a cardiac cycle resembles the first phase of the next cardiac cycle. Five harmonics can provide sufficient resolution for the model.

Figure 2:
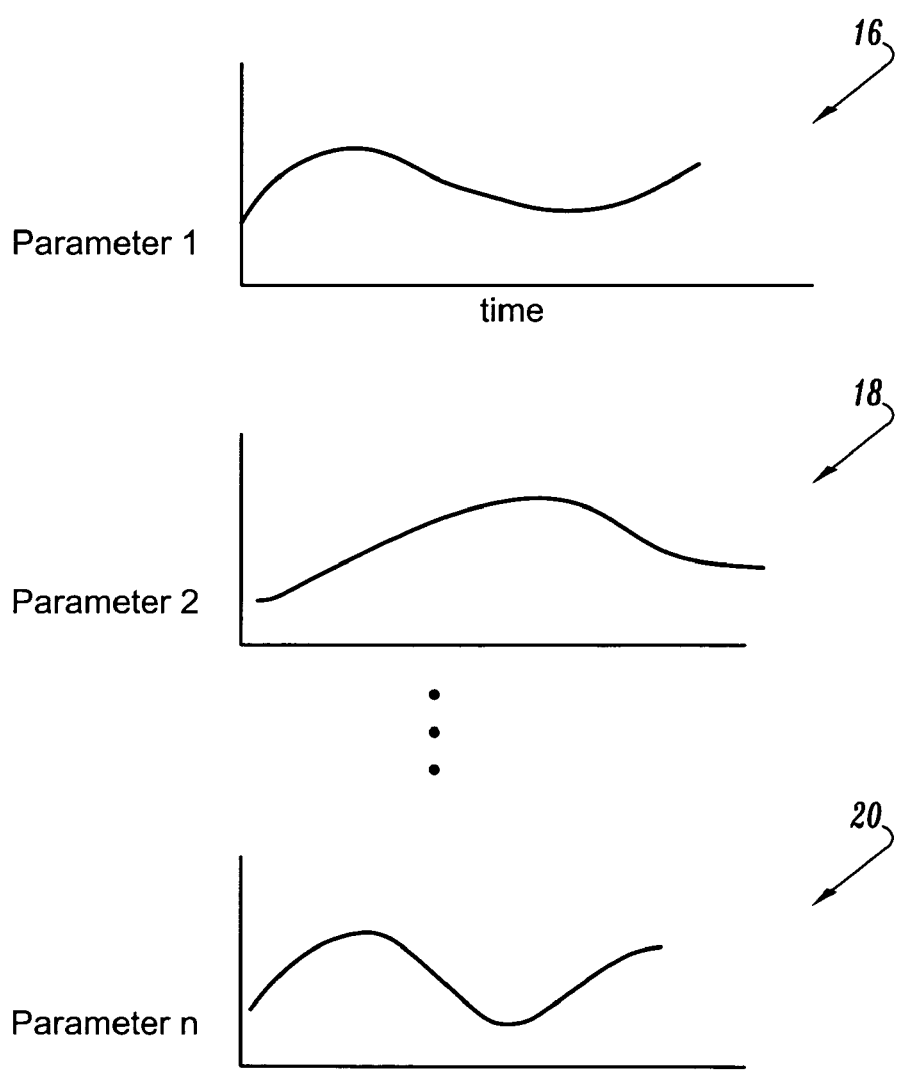
FIG. 2 shows Time-Parameter curves.

FIG. 2 shows Time-Parameter curves. The parameter values describing the LV Model above change over the cardiac cycle. The curves 16–20 show the change for n parameters. These curves are described using harmonics. Various parameters can be used to describe the LV model and changes in the model over a given time period. In our case they are the spline control points.

Figure 3A:
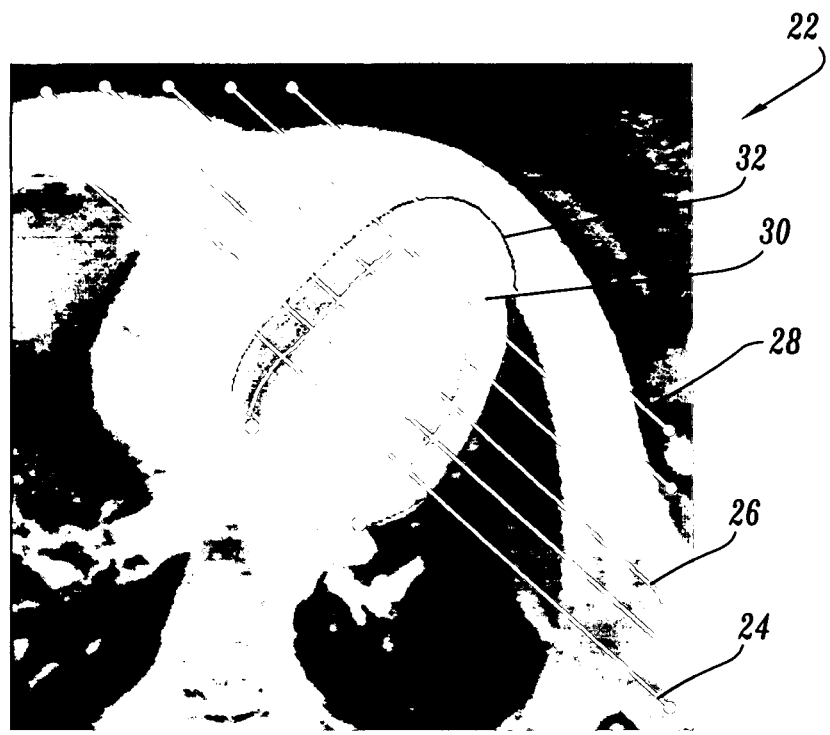
FIG. 3A is an exemplary model of a heart.
Figure 3B:
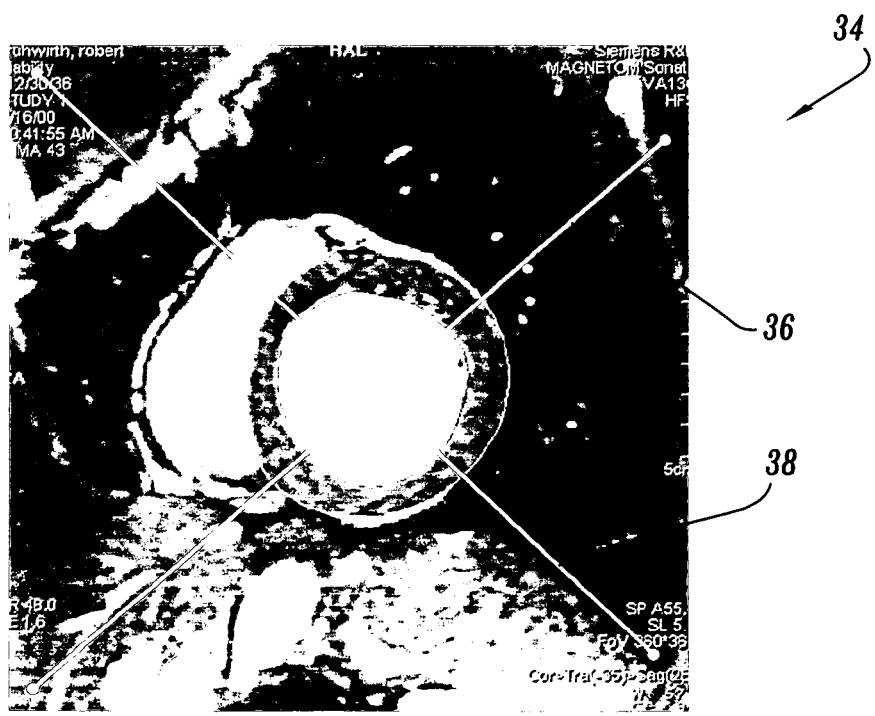
FIG. 3B is an another view of the heart model.
Figure 3C:
FIG. 3C shows exemplary guide-points for manipulating a 3-D instance of the model.
Figure 3D:
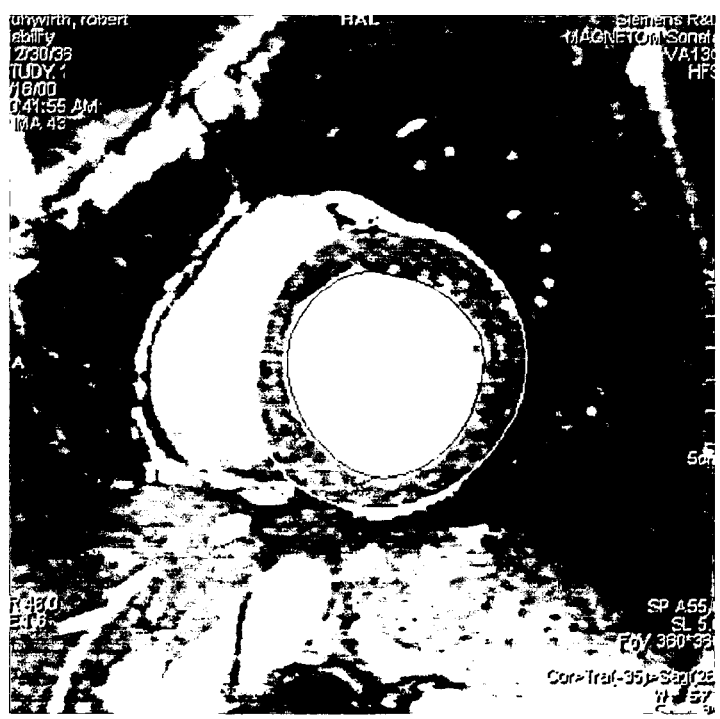
FIG. 3D is a top view of the contours in the model.
Figure 3E:
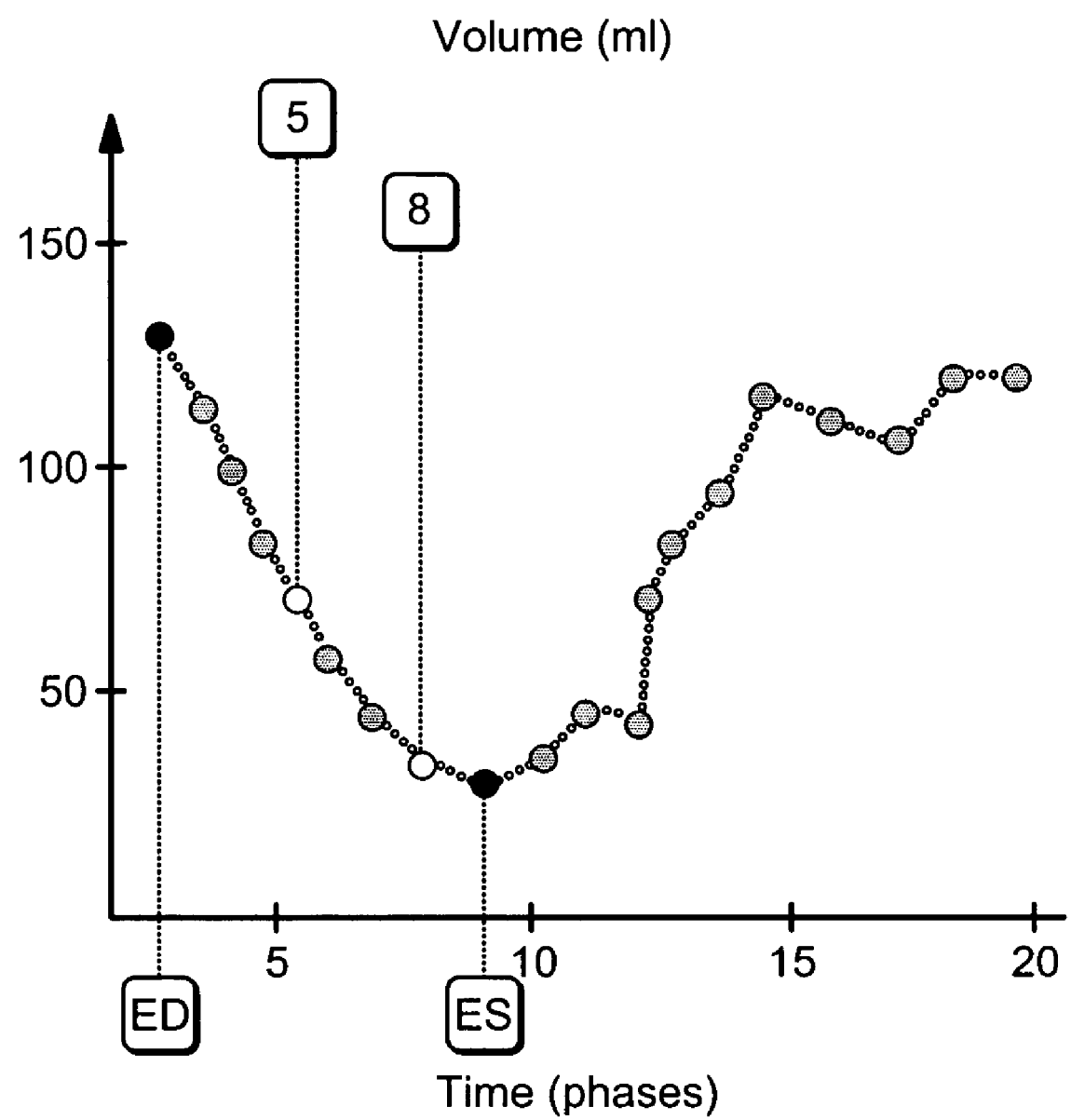
FIG. 3E shows a graph of volume (Y-axis) versus time/phases (X-axis)

FIG. 3A is an exemplary model of a heart. FIG. 3B is an another view of the heart model. FIG. 3C shows exemplary guide-points for manipulating the model. FIG. 3D is a top view of the cross-section of the model. FIG. 3E shows a graph of volume (Y-axis) versus time/phases (X-axis). The model view 22 is a computational 3-D instance of the model. The bottom row 24 of the model corresponds to the image plane at the middle row 26. The cross-section 30 represents the endocardium (inner wall) and the cross-section 32 represents the epicardium (outer wall). Model view 38 has two axes 42 and 44. If the heart is dissected at the axes 42 and 44 then the image plane will correspond to the middle row 34.

The model views will typically be shown on a display device connected to a medical imaging device. The display device can include a pointer like device that allows the user to adjust the contours to fit the model. For example, FIG. 3B shows four exemplary guide-points. Guide points 40 and 42 are guide-points used to fit the model to the endocardium. Similarly, guide points 44 and 46 are used to fit the model to the epicardium. By changing the position of the guide points 40–46 the contours of the 32 and 30 are refitted. The change is reflected in a top view of the contours in the FIG. 3D.

FIGS. 3A–3D show different views of the model at different phases. Further, the views represent different phases (points in time). For example, FIG. 3A is a view of the model at the $5^{th}$ phase, while FIG. 3C is a view of the model at the $8^{th}$ phase.

FIG. 3E shows a graph of volume (Y-axis) versus time/phases (X-axis). As can be seen from the graph the volume of the heart at the $5^{th}$ phase is greater than the volume at the $8^{th}$ phase which falls approximately before the mid-point of the cardiac cycle. An illustration next describes an application of the above graph. A doctor using the graph can determine the amount of blood being pumped into and out of the heart at a given phase and hence determine the function of the LV.

Figure 3F:
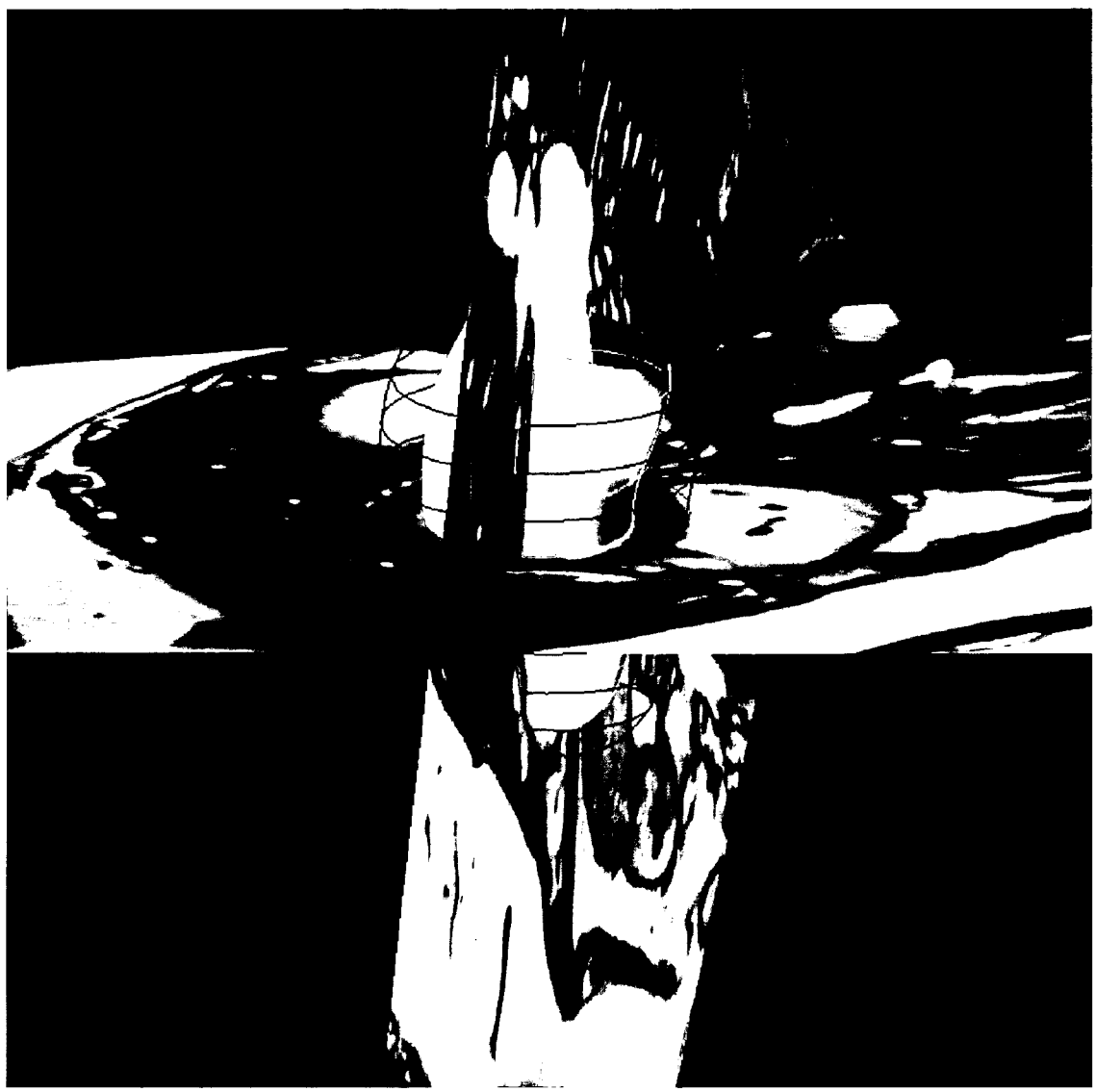
FIG. 3F shows a three dimensional view of the image model for an exemplary heart.

FIG. 3F shows a three dimensional view of the image model for an exemplary heart. The contours are shown as concentric rings and image planes are shown in a symbolic form. The 4-D model is instanitaed at a single phase to form a 3-D model. Shown is the endocardial surface. The epicardial surface is not shown; however, the intersections of this surface with the image planes from the input data are displayed. In addition two of those image planes are shown.

The 3D model of the LV geometry for each frame is deformed under the influence of image-derived edge information and user-placed guide-points as well a prior model if one exists. After each guide-point is edit is completed, the model parameters from all frames are fit in time using Fourier basis functions with five harmonics. The time fit result is used as a spatial prior for subsequent image processing and user editing in phases that have no guide points.

The modeling system used for spatio-temporal modeling allows user-interrupts so that the user can make several changes to the current frame before the changes are propagated to the surrounding frames. The user is provided feedback on the convergence process via an interactive plot of volume and mass versus time.

A pure 4D model is computationally expensive because any movement in any one phase affects all phases with changes being propagated to all phases. However, in the spatio-temporal model, the 3D model is fitted at selected phases and the parameters used to describe the 3D model are propagated via spherical harmonics as described above.

Figure 4A:
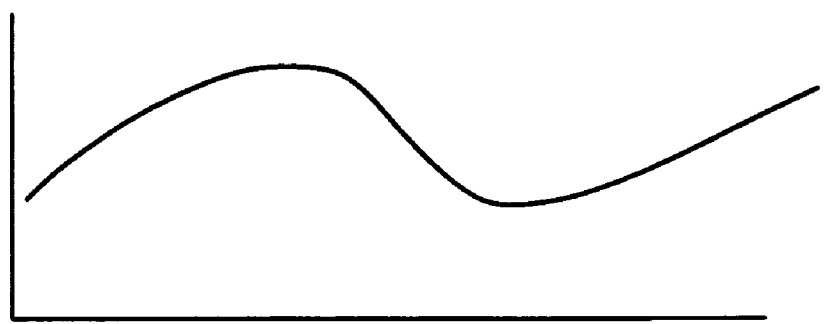
FIG. 4A shows a graph for a parameter before a guide point is placed at a phase t.
Figure 4B:
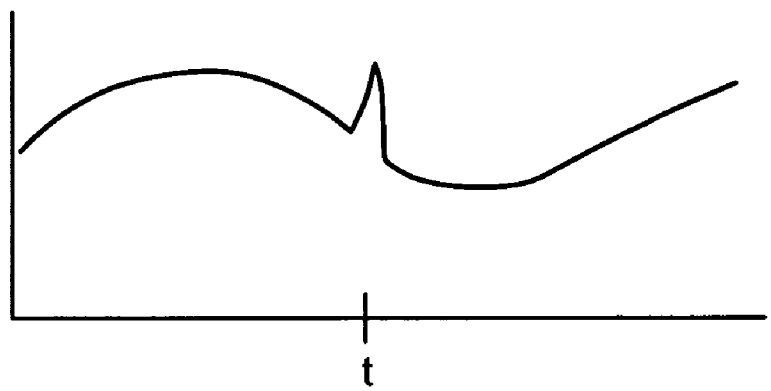
FIG. 4B shows a spatial fit of the model at phase t.
Figure 4C:
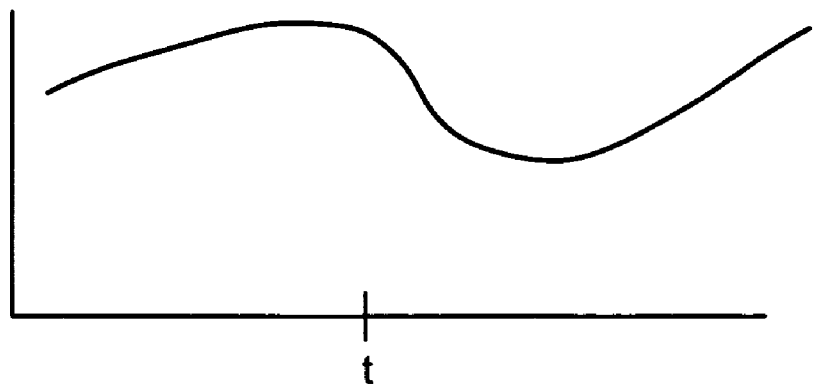
FIG. 4C shows temporal fit of the 4-D model.

FIG. 4A shows a graph for a parameter before a guide point is placed at a phase t. FIG. 4B shows a spatial fit of the model at phase t. FIG. 4C shows temporal fit of the model. An exemplary parameter is shown in FIGS. 4A–4C in the form of a graph. In FIG. 4A the graph of a parameter is shown before an exemplary guide point is placed and that parameter is influenced. In FIG. 4B a "spatial fit: (i.e., a fit at that time) is achieved the guide point at the phase t. The contour temporally adjusts as shown in FIG. 4C by using spherical harmonics so that the position 4-D model at other time phases is influenced based on the previously achieved spatial fit. Hence, a spatio-temporal fit of the model is achieved by minimal human input of manipulating a single guide point at a single phase while the 4-D model at the other time phases is adjusted automatically.

Figure 5:
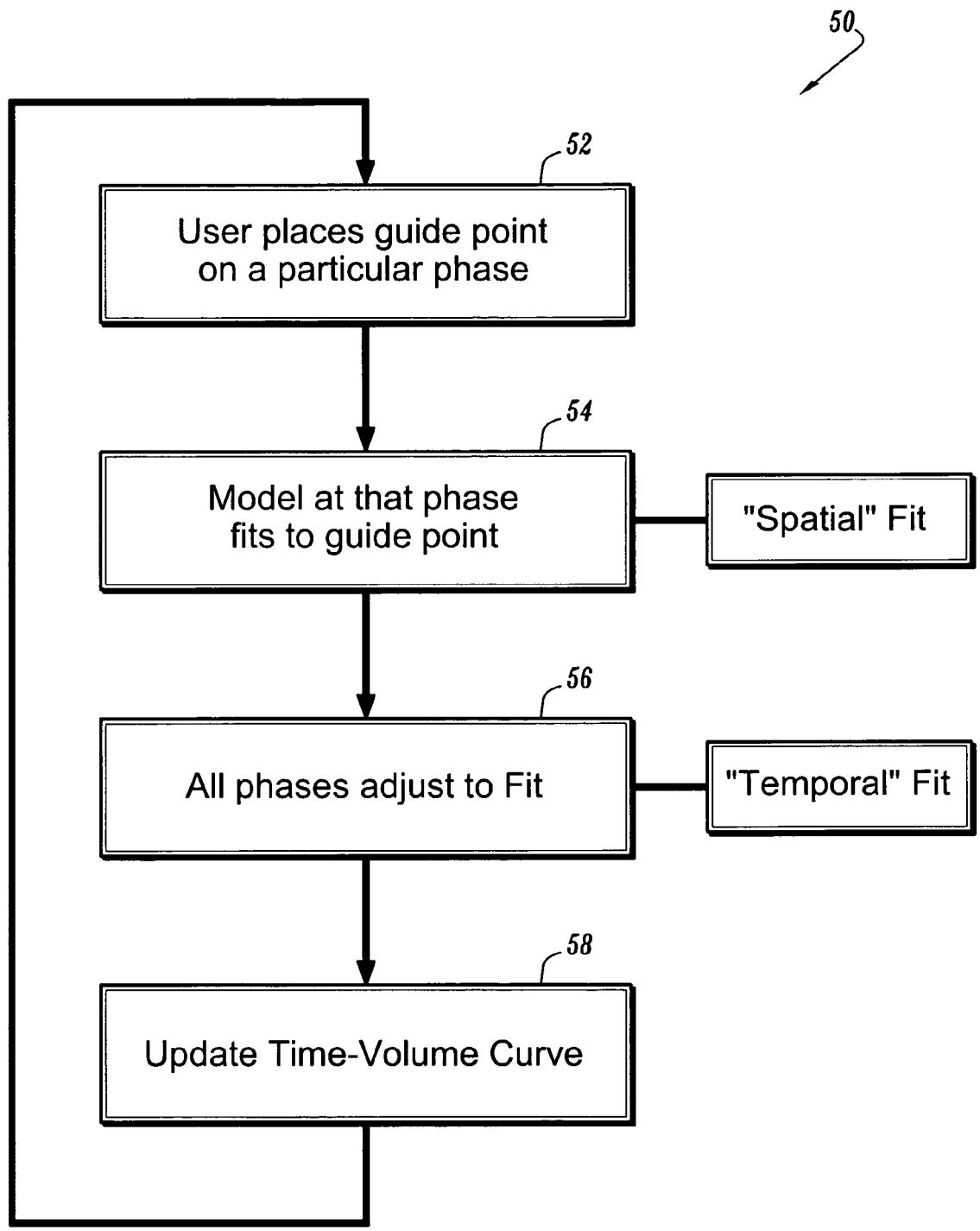
FIG. 5 is a flowchart showing the spatio-temporal process in an embodiment of the present invention.

FIG. 5 is a flowchart showing the spatio-temporal process in an embodiment of the present invention. Flowchart 50 shows the operational steps of implementing the spatio-temporal guide point based modeling process. At step 52 a user positions at least one guide point on a particular phase of the model. At step 54 a spatial fit (see FIG. 4B) is achieved when the model at that phase fits to the guide point through the user adjusting the position of the guide point. At step 56 a temporal fit (see FIG. 4C) is achieved when all the other phases are adjusted to fit the model. The time-volume curve (see FIG. 3E) is updated at step 58 and the process is repeated till the fit stabilizes, which is achieved when adding more guide points does not change the volume-time curve significantly.

Figure 6:
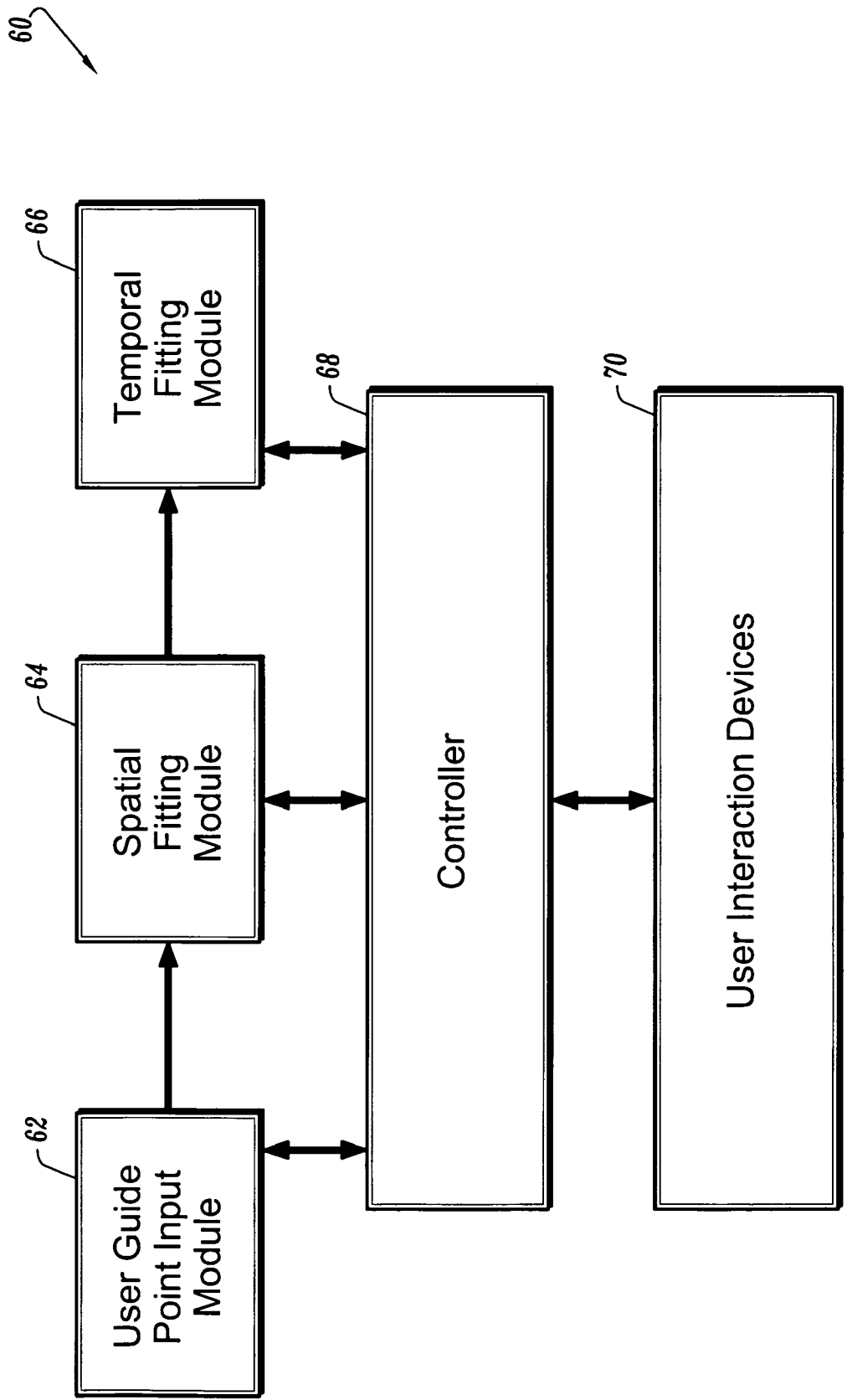
FIG. 6 is an exemplary block diagram of a system used to implement the spatio-temporal modeling in an embodiment of the present invention.

FIG. 6 is an exemplary block diagram of a system used to implement the spatio-temporal modeling in an embodiment of the present invention. The system 60 includes a user guide point input model that allows user to interactively place guide points on the appropriate phases. A spatial fitting model 64 allows a user to spatially fit the phase to a guide point as described above. Thereafter, a temporal fit of the phase is performed by interpolating positions of the model for other phases in a temporal fitting module 66. A controller 68 provides necessary control function to coordinate the other modules and the user interaction devices 70. Further, display and other output devices (not shown) can be included to display the image model and perform guide point modeling. Output device can further be utilized to show the Volume/Mass versus Time curve (See FIG. 3E).

Figure 7:
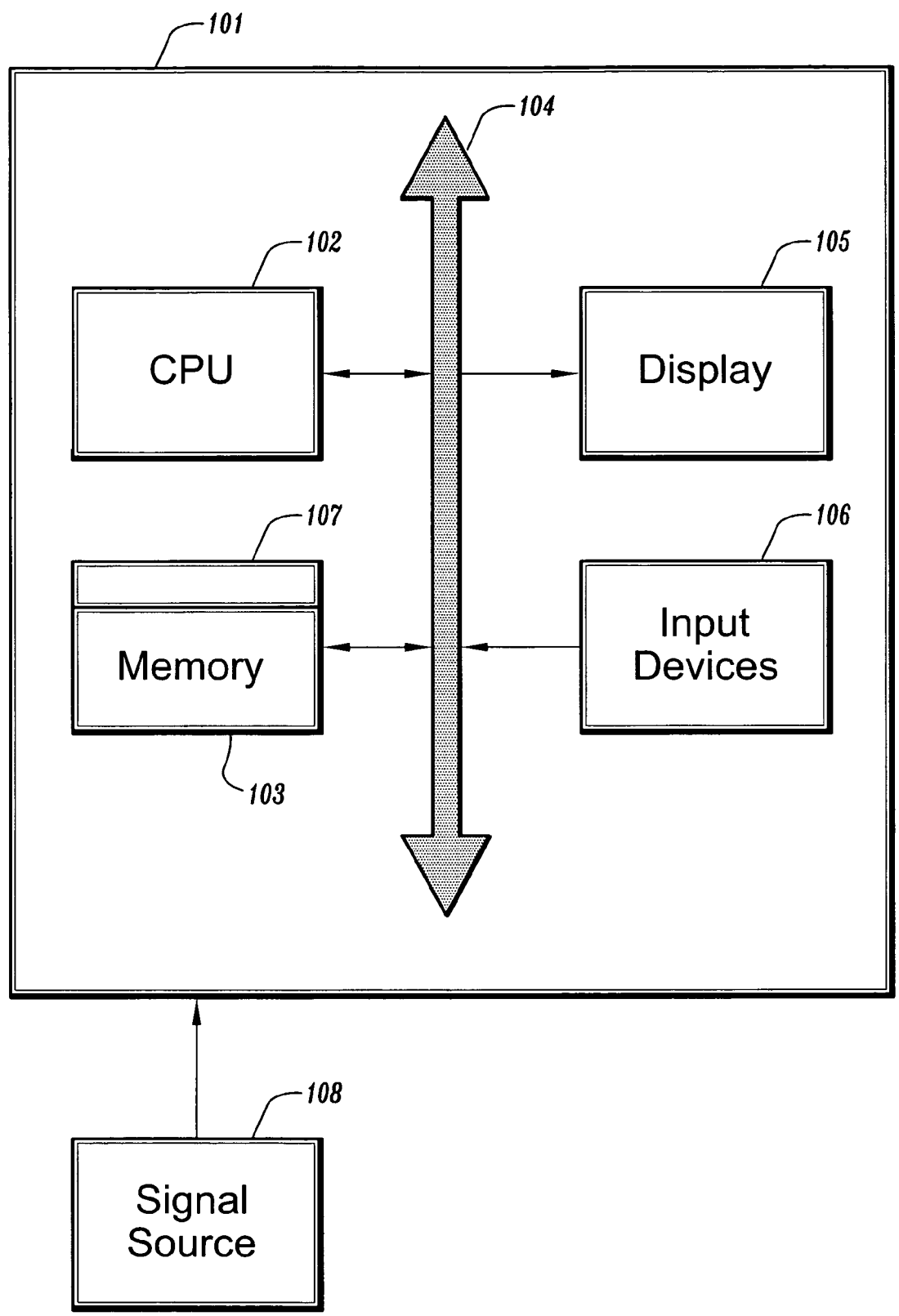
FIG. 7 is a block diagram of an exemplary computer system used to implement the present invention.

Referring to FIG. 7, according to an embodiment of the present invention, a computer system 101 for implementing the present invention can comprise, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general purpose computer system that becomes a specific purpose computer system when executing the routine 107 of the present invention.

The computer platform 101 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A system for spatio-temporal modeling of an object, the system comprising:
    a guide-point input module for receiving at least one guide point position on a first phase as an input, the first phase being one of a plurality of phases corresponding to a 4-D image model of the object;
    a spatial fitting module for fitting an 3-D instance of the 4-D model at the first phase corresponding to the guide point;
    a temporal fitting module for fitting the 4-D model to all of the of phases; and
    a controller for comparing a change in volume of the object correlated to time to a threshold between iterations of the spatio-temporal modeling, and determining a convergence upon the change being less than or equal to the threshold, wherein for each iteration the guide-point input module receives a further guide point position on the first phase.

2. The system of claim 1 further comprising:
    a user input device for receiving the guide point position input from the user.

3. The system of claim 1 further comprising:
    an output device for displaying a graph of volume of the object correlated to time.

4. The system of claim 3 wherein the graph is updated in real-time with changes in the image model.

5. The system of claim 3 wherein the user is informed about a status of a convergence process, wherein the graph substantially remains the same when the number of guide points is increased at a state of convergence.

6. A program storage device readable by machine, tangibly embodying a program of instructions executable by the machine to perform method steps for spatio-temporal modeling of an object, the method steps comprising:
    receiving a guide point position on a first temporal phase as an input, the first temporal phase being one of a plurality of temporal phases corresponding to a 4-D image model of the object;
    fitting a 3-D instance of the 4-D model at the temporal phase corresponding to the guide point;
    fitting the 4-D model to all of the temporal phases;
    comparing a change in volume of the object correlated to time to a threshold between iterations of the spatio-temporal modeling; and
    determining a convergence upon the change being less than or equal to the threshold, wherein for each iteration a further guide point position on the first temporal phase is received.

7. The method of claim 6 further comprising:
    receiving the guide point position input from the user through a user input device.

8. The method of claim 7 further comprising:
    temporally fitting the 4-D model to all of the temporal phases upon receiving the further guide point by propagating the spatial fit of the first temporal phase to the all the temporal phases.

9. The method of claim 7 further comprising:
    displaying a graph of volume correlated to time on an output device.

10. The system of claim 7 wherein the graph is updated in real-time with the spatial and temporal changes in the image model.

11. The method of claim 10 wherein the user is informed about a status of a convergence process, wherein the graph substantially remains same at a state of convergence when the number of guide points is increased.

12. A method of four dimensional spatio-temporal modeling of an object, the method comprising:
    acquiring the image over a plurality of phases of time;
    forming a 4D model of the object;
    receiving, iteratively, at least one guide point as an input from the user to fit the model to a first phase selected from the plurality of phases after a fitting of a 3D instance and the 4-D model;

fitting the 3D instance of the 4D model at the first phase corresponding to the guide point;

fitting the 4-D model at all the phases based on the changes to the model in one phase; and outputting the 4-D model upon determining a change in a volume of the object correlated to time being less than or equal to the threshold.

13. The method of claim 12 wherein the image is a cardiac image.

14. The method of claim 13 wherein step of fitting the 4-D model comprises:

interpolating the image model fitted at the first phase to all phases using spherical harmonics.

* * * * *